E. LEWIS.
KNIFE.
APPLICATION FILED APR. 29, 1919.
1,329,912.
Patented Feb. 3, 1920.
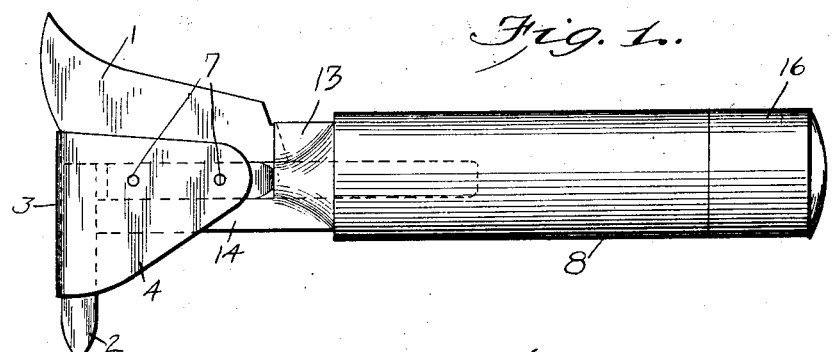
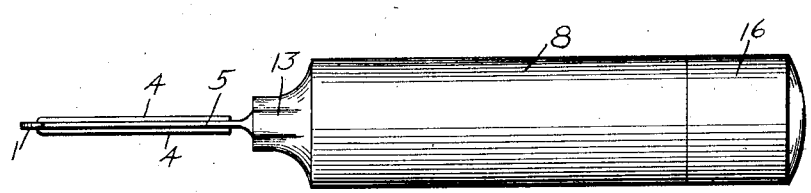
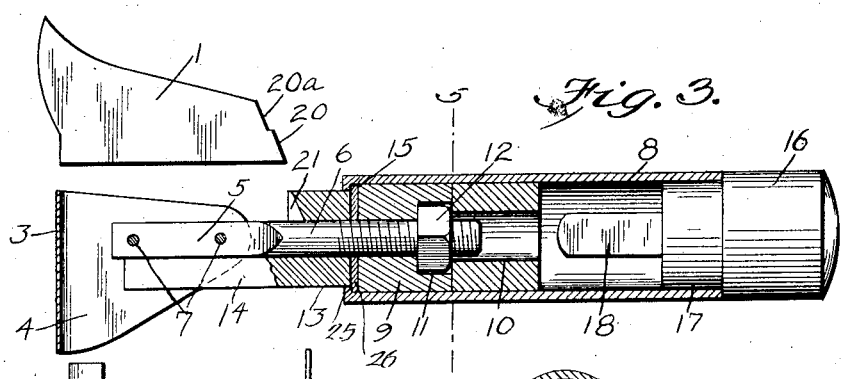
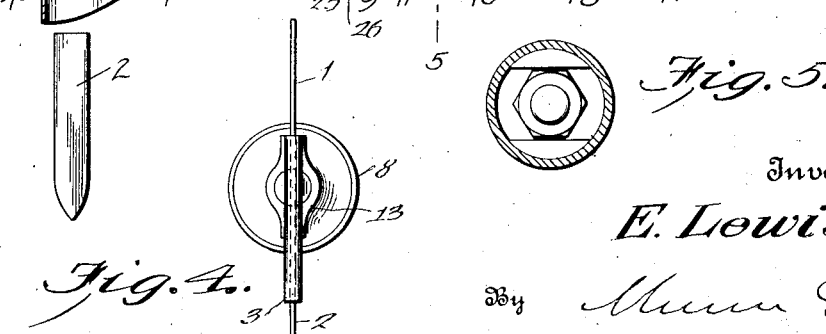
Inventor
E. Lewis
By Munn & Co
Attorney

UNITED STATES PATENT OFFICE.

ELIAS LEWIS, OF TERRE HAUTE, INDIANA.

KNIFE.

1,329,912. Specification of Letters Patent. Patented Feb. 3, 1920.

Application filed April 29, 1919. Serial No. 293,423.

*To all whom it may concern:*

Be it known that I, ELIAS LEWIS, a citizen of the United States, and a resident of Terre Haute, in the county of Vigo and State of Indiana, have invented certain new and useful Improvements in Knives, of which the following is a specification.

My invention is an improvement in knives, and has for its object to provide a knife especially adapted for use with prepared roofing, linoleum, felts, cardboard, paper, leather and the like, and in marking, splitting, trimming and cutting, and also adapted for use as a pruning knife, for trimming shrubbery, vines, trees and the like.

In the drawings:

Figure 1 is a side view of the improved knife;

Fig. 2 is a top plan view;

Fig. 3 is a longitudinal section with the blades detached;

Fig. 4 is an end view;

Fig. 5 is a section on the line 5—5 of Fig. 3.

In the present embodiment of the invention a plurality of blades is provided, one of the blades 1 being a marking and trimming blade, and the other 2 being a splitting and cutting blade. A holder for the blades is provided, this holder being substantially U-shape and comprising a body 3 and arms 4, and the arms are lapped upon opposite sides of the flattened portion 5 of a shank 6, and are secured to the flattened portion by rivets 7 or the like.

A hollow handle portion 8 is provided, the said portion having a cylindrical core 9 of wood or the like, which is provided with a central bore, and this bore 10 is enlarged intermediate its ends, as indicated at 11, to receive a nut 12, the enlargement being polygonal in cross section.

The shank 6 at the end remote from the flattened portion is threaded as shown, to engage the nut, the threaded portion passing through the bore of the core, and the core fits smoothly within the handle 8. A collar 13 is mounted on the shank at the end of the handle adjacent to the blades, the said collar fitting the shank closely, but being movable longitudinally thereof, and this collar has an extension 14 between the arms 4 of the blade holder, and is adapted to engage the edge of the blade 2 to clamp the said blade against the body 3 of the holder.

The extension fits smoothly along the bottom edge of the flattened portion of the shank, and the adjacent end of the handle has an inwardly extending flange 25, which engages over a washer 26 secured to the collar, the arrangement being such that the collar is held to the handle when the shank 8 remote from the blade holder is closed by a ferrule 16 which has an extension 17 fitting within the handle. This extension carries a blade 18 which is normally held within the hollow handle, and is provided for the purpose of cleaning the blades 1, and 2.

Referring to Fig. 3, it will be seen that the blade 1 is roughly polygonal, one side being straight to fit along the flattened portion of the shank 5. A portion of the end at one end of this side is straight, as indicated at 19, and is perpendicular to the straight side, and this straight portion of the end is adapted to abut the body 3 of the holder. The opposite end is inclined and stepped as indicated at 20 and $20^a$ respectively, and the portion 20 is adapted to fit within a notch or recess 21 in the collar 13.

This blade has a point, as shown, and any portion thereof which extends beyond the holder may be sharpened to provide a cutting edge. With the parts in the position of Fig. 3, the blade 1 is slipped into the holder above the flattened portion of the shank and the blade 2 is slipped into the holder from below until its upper end abuts against the lower edge of the blade 1. The handle is now turned with respect to the shank, turning thus the nut 12, and the collar 13 is forced toward the body 3 of the holder. The extension 14 clamps the blade 2, and the collar clamps the blade 1.

The improved knife is especially desirable for handling roofing as roofing can only be cut successfully with a sharp keen point, because of the sand and grit and the rough surface of the roofing. Thus a point is quickly destroyed. The small blades 2 in the present knife can be produced at a very small cost and when worn out can be thrown away and replaced by new ones. Thus practically a new tool is provided with but very slight expense.

I claim:

A knife comprising a plurality of blades and a substantially U-shaped holder consisting of a body and arms, a shank arranged between the arms of the holder, the arms being secured to the shank, a handle, a connection between the handle and the shank for constraining the shank and the handle to move longitudinally with respect to each other when they are rotated with respect to each other, one of the said blades being arranged between the shank and the body of the holder, the handle having an extension for engaging the blade to hold it against the body of the holder when the holder is moved toward the handle, the other blade being clamped between the handle and the body of the shank.

ELIAS LEWIS.